United States Patent Office 3,385,160
Patented May 28, 1968

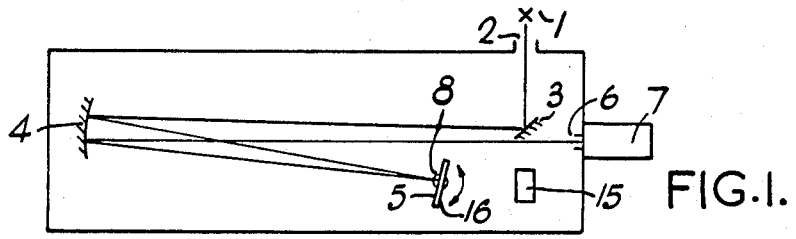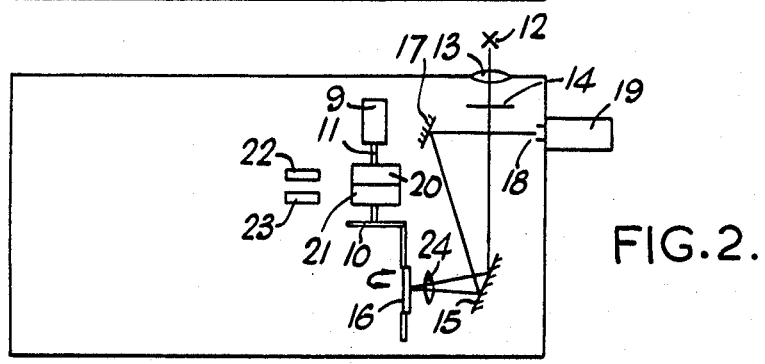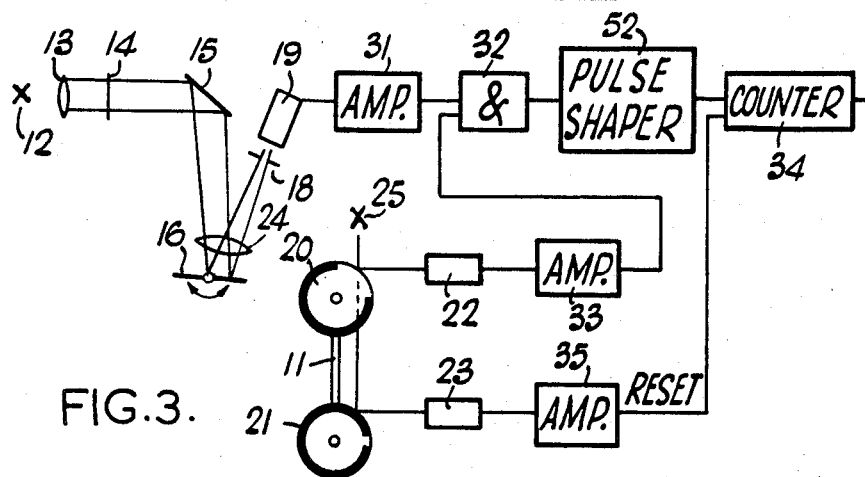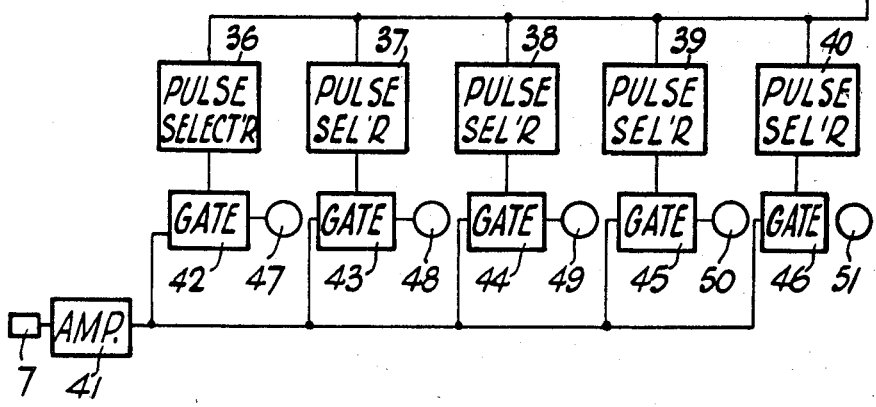

3,385,160
SCANNING SPECTROPHOTOMETER WITH PULSE REFERENCING
John Barker Dawson, Otley, and Duncan Jackman Ellis, Yeadon, near Leeds, England, assignors to National Research Development Corporation, London, England, a British corporation
Filed Jan. 25, 1965, Ser. No. 427,684
Claims priority, application Great Britain, Feb. 4, 1964, 4,751/64
4 Claims. (Cl. 88—14)

ABSTRACT OF THE DISCLOSURE

A high speed scanning spectrophotometer is provided which comprises a rotatable diffraction grating which repetitively oscillates to and fro, a slit through which light from the diffraction grating is directed and a detector for receiving the light after it passes through the slit and converting the light into a repetitive electrical signal train. The spectrophotometer further comprises means including a mirror secured to the back of the diffraction grating for generating, in synchronism with the movement of the diffracting grating, a repetitive reference pulse train the pulses of which occur at instants corresponding to predetermined wavelengths of the spectrum of the repetitive electrical signal train, selection means for selecting a pulse of the reference train to gate the corresponding part of the signal train and means for measuring the magnitude of the gated portion of the signal train.

---

This invention relates to scanning spectrophotometers.

Such spectrophotometers are useful in the estimation of the proportions of different elements or compounds in a sample by emission or absorption optical spectroscopy. Various forms of scanning spectrophotometer which scan at a high speed are known but they suffer from the disadvantage of the difficulty in calibrating the spectrophotometer in terms of wavelength.

According to the present invention a high speed scanning spectrophotometer comprises means for obtaining a repetitive signal train representing the spectrum of a sample over a range of wavelengths, means for obtaining a reference repetitive pulse train the pulses of which occur at instants corresponding to predetermined wavelengths of the spectrum in said repetitive signal train, means for selecting a pulse of the reference pulse train to gate the corresponding part of the signal train, and means for measuring the magnitude of the gated portion of the signal train.

In carrying out the invention the means for obtaining the repetitive signal train may comprise cyclically operated scanning means comprising a dispersing element on which light from the sample falls and arranged to be rotated through a small angle in an oscillatory manner.

In an embodiment of the invention the reference pulse train is obtained from a light source the output of which is directed through a relatively coarsely lined graticule on to a mirror mechanically coupled to rotate with the diffraction grating and direct the light output through a collimator slit on to a photoelectric device so that as the mirror rotates the output of said device comprises a pulse train representing the lines of the graticule. It is convenient to provide a plurality of different channels to each of which the electrical signal train representing the spectrum is applied, each channel being gated by a pulse selected from the pulse train.

The measuring means may comprise an integrating circuit and where a plurality of channels are provided each channel includes such an integrating circuit. In use it is convenient to include a known element in the sample being measured as a reference element and select one of the channels as a reference channel in which case the integrating circuit associated with that channel is arranged to be charged to a predetermined value at which instant the inputs to the integrating circuits in the remaining channels are cut off so that the charges then present in those circuits represent the relative magnitudes of the signals of the wavelengths selected to be gated into those channels.

In order that the invention may be more fully understood reference will now be made to the accompanying drawing.

FIG. 1 and FIG. 2 illustrate a high-speed scanning spectrophotometer embodying the invention in plan and elevation respectively, and FIG. 3 illustrates associated electronic circuitry for use with the spectrophotometer illustrated in FIG. 1 and FIG. 2.

Referring now to FIG. 1 and FIG. 2 a sample, the elements in which are to be measured is provided at a position 1 and is excited to produce a light radiation output which is passed through an entrance slit 2 on to a plane mirror 3 from which it is reflected by a curved collimating mirror 4 on to a dispersing element comprising a diffraction grating 5. Alternatively, the dispersing element may comprise a prism. The light falling on diffraction grating 5 is split into its component wavelengths and forms a range of spectrum lines. These lines are reflected by collimating mirror 4 and directed through a narrow slit 6 on to a photomultiplier tube 7. Due to the narrowness of slit 6 only a small part of the spectrum will pass through slit 6 onto photomultiplier tube 7. Diffraction grating 5 is arranged to be oscillated through a small angle about a vertical axis 8 by means of a motor 9 which rotates a cam 10 through a shaft 11 (shown more clearly in FIG. 2. Cam 10 produces steady angular movement of grating 5 in one direction followed by a relatively rapid flyback, the flyback time being about one quarter of the time of the initial movement of the diffraction grating. It will be appreciated that as diffraction grating 5 is rotated in oscillatory fashion all the spectrum will be swept past slit 6 so that the electrical output from the photomultiplier tube 7 will be a pulse train representing in time the spectrum lines from source 1.

The arrangement for obtaining a reference signal is shown more clearly in the elevation of FIG. 2. An ordinary filament lamp 12 has its light output passed through a condenser lens 13 and a relatively coarsely lined graticule 14 on to a plane mirror 15 and then through an image forming lens 24 on to a further mirror 16 which in fact is secured to the back of diffraction grating 5. Thus mirror 16 follows the oscillatory rotating movement of diffraction grating 5. The reflected output from mirror 16 is returned through lens 24, mirror 15 and a further mirror 17 and through a narrow slit 18 on to a photomultiplier 19. It will be seen that as mirror 16 oscillates it will sweep the image of the reference graticule 14 over slit 18 so that an image of each part of this reference graticule is passed through slit 18 on to photomultiplier 19 in turn. Thus the output of photomultiplier 19 will be a repetitive electrical pulse train, the number of pulses in which corresponds to the number of lines in the graticule 14.

It will be appreciated that since mirror 16 and diffraction grating 5 move in exact synchronism with each other each pulse of the pulse train obtained from photomultiplier 19 corresponds to a particular wavelength in the spectrum that is swept by diffraction grating 5.

Motor 9 in addition to rotating cam 10 also rotates a pair of discs 20 and 21 which co-operate respectively with two small photodiodes 22 and 23. These photodiodes are arranged to be energised from a light source 25 by reflection from reflecting surfaces of the discs. Disc 20 includes a band which is silvered over about ⅕ of its circumference and is blackened over the remaining ⅘ so that photodiode 22 is de-energised during the forward linear sweep of the diffraction grating and mirror and is energised during the flyback period. Disc 21 carries a small silvered area which is arranged to energise photodiode 23 at the end of the forward sweep only. The function of the electrical signals obtained from photodiodes 22 and 23 will be explained in connection with FIG. 3.

Referring now to FIG. 3 the pulse output from photomultiplier tube 19 is passed through an amplifier 31 to an AND gate 32. In addition the output from photodiode 22 is, after passing through an amplifier 33, also fed to the AND gate 32. By this means pulses are obtained from AND gate 32 only during the relatively slower forward sweep of the mirror 16 and the pulse train is cut off during its flyback period. The output from AND gate 32 is thus a repetitive pulse train having gaps equal to about ¼ of the time of each train between successive trains of pulses. These pulse trains are, after shaping in a suitable pulse shaper circuit 52, fed to a multi-stage counter 34. The maximum number which pulse counter 34 can count is at least equal to the total number of pulses in a train, and in a particular example where each pulse train comprises about 320 pulses, pulse counter 34 is a three-decade counter.

Resetting means are provided for counter 34 and a reset pulse is provided by photodiode 23. This reset pulse is a single pulse which is produced at the instant at which the energising of photodiode 22 commences at the end of the forward sweep of the oscillating diffraction grating 5 and mirror 16 and as the flyback period begins. This reset pulse, after amplification in an amplifier 35, is fed to the counter so that as soon as the counter reaches the maximum count at the end of a train of pulses it is reset to zero to await the commencement of the next train.

An output is taken from every stage of counter 34 and fed to five sets of pulse selector switches 36 to 40 in parallel. Where counter 34 is a three-decade counter each set of pulse selector switches can comprise three decade switches the outputs of which are taken to a suitable coincidence gating circuit so that only the particular pulse selected by the setting of the set of decade switches is obtained. It will thus be seen that any one pulse of the total number of pulses in a pulse train can be selected in any one of the five channels.

The electrical signal train representing the spectrum of a sample which is obtained from photomultiplier tube 7 is, after amplification in an amplifier 41, fed in parallel to gates 42 to 46 respectively in each of the five channels. These gates are controlled by the pulses selected by the pulse selectors in those channels so that only that portion of the total signal train representing the spectrum that occurs at the same instant as a selected pulse is gated through the associated gate. The gated portions of the signal trains are then applied to suitable measuring circuits 47 to 51 in each of the channels. These measuring circuits can conveniently comprise integrating circuits in which the charge on a capacitor is built up at a rate depending on the magnitude of the gated portion of the signal.

In use of the apparatus one of the five channels can be designated a reference channel and is set to gate a known element which is included in the source 1. When the charge in the integrating circuit associated with the reference channel has built up to a predetermined value it is arranged to cut off the inputs to the integrating circuits in each of the four remaining channels so that the charges then indicated in these channels gives a measure of the amounts of the elements in those channels that have been selected by the pulse selectors.

It is convenient to include means in each channel for shifting and spreading the selected pulses by small amounts so that wavelengths corresponding to gaps between adjacent pulses can be selected if desired.

It will be understood that the apparatus described above may be modified without departing from the invention. Thus for example in place of the continuously rotating motor 9 driving a cam 10 to produce oscillatory motion of diffraction grating 5 and mirror 16 a torque motor may be used directly coupled to the diffraction grating and mirror and driven by a suitable ramp waveform. With this arrangement the provision of a gating pulse to AND gate 32 and a resetting pulse to counter 34 in each cycle of the ramp waveform may be achieved by the generation of suitable gating pulses timed with reference to this ramp waveform.

For use in absorption work a further entrance slit may be provided in addition to entrance slit 2 and positioned side by side (in the plane of the paper in FIG. 1) thereto. This second entrance slit receives light which bypasses the absorbing cell or flame so that at the exit slit 6 a double spectrum is formed separated by a distance equal to the separation between the two entrance slits. One of the output channels can be set on the absorbed beam and the other on the reference beam so that by the ratio of the signals accumulating in these channels the optical density of the cell or flame may be determined directly.

If a very wide spectral response is required it may be convenient to provide two exit slits in place of the single exit slit 6. Each exit slit is provided with a suitable detector and appropriate filters may be incorporated in each optical path to eliminate overlapping and second order spectra.

We claim:

1. A high speed scanning spectrophotometer comprising rotatably mounted light dispersion means, means for repetitively oscillating said light dispersion means to and fro, slit means through which the light from said dispersion means is directed, a detector for receiving the said light from said slit means and converting such light into a repetitive electrical signal train, means responsive to the movement of said light dispersion means for generating a repetitive reference pulse train in synchronism with the movement of said light dispersion means the pulses of which occur at instants corresponding to predetermined wavelengths of the spectrum in said repetitive electrical signal train, selection means for selecting a pulse of the reference pulse train to gate the corresponding part of the signal train, and measurement means for measuring the magnitude of the gated portion of the signal train.

2. The spectrophotometer as claimed in claim 1 in which there are provided a plurality of channels arranged to receive said repetitive signal train, individual gates associated with each channel, counting means for counting the pulses of said reference pulse train, individual selection means associated with each of said gates for selecting a particular count output from said counting means and opening said gates for short instants of time on receipt thereof, and in which individual measuring means are provided in each of said channels to measure the relative magnitude of the gated portions of said electrical signal train.

3. The spectrophotometer according to claim 2 in which the measuring means in each channel comprises an integrating circuit which integrates the gated portion of the repetitive signal train over a period of time.

4. A high speed scanning spectrophotometer comprising a rotatably mounted dispersing element positioned to obtain the spectrum of a sample, means for repetitively oscillating said element to and fro, slit means, a detector for receiving the spectrum from said element as transmitted through said slit means and converting light signals therefrom into a repetitive electrical signal train, a light source, a relatively coarsely lined graticule, a mirror mounted to rotate with said element and receive light from said light source through said graticule, a collimator slit, a detector for receiving light reflected by said mirror through said collimator slit and obtaining therefrom a pulse train the pulses of which occur at instants corresponding to predetermined wavelengths of the spectrum in said repetitive electrical signal train, means for selecting a pulse of the reference pulse train to gate the corresponding part of the signal train, and means for measuring the magnitude of the gated portion of the signal train.

References Cited

UNITED STATES PATENTS

| 2,871,465 | 1/1959 | Nielsen | 88—14 |
| 3,011,386 | 12/1961 | Rosenthal | 88—14 |
| 3,012,467 | 12/1961 | Rosenthal | 88—14 |
| 3,030,854 | 4/1962 | Peras. | |

JEWELL H. PEDERSEN, *Primary Examiner.*

B. LACOMIS, *Assistant Examiner.*